US012641565B2

(12) United States Patent
　　 Guo

(10) Patent No.: US 12,641,565 B2
(45) Date of Patent: May 26, 2026

(54) POSITIONING MEASUREMENT MECHANISM AND METHODS OF OPERATING THE SAME

(71) Applicant: GUANGDONG OPPO MOBILE TELECOMMUNICATIONS CORP., LTD., Dongguan (CN)

(72) Inventor: Li Guo, Allen, TX (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 315 days.

(21) Appl. No.: 18/367,684

(22) Filed: Sep. 13, 2023

(65) Prior Publication Data

US 2024/0007990 A1　　Jan. 4, 2024

Related U.S. Application Data

(63) Continuation of application No. PCT/IB2022/054046, filed on May 2, 2022.

(60) Provisional application No. 63/183,400, filed on May 3, 2021.

(51) Int. Cl.
　　 *H04L 5/00* 　　　　 (2006.01)
　　 *H04W 64/00* 　　　 (2009.01)

(52) U.S. Cl.
　　 CPC ........... *H04W 64/00* (2013.01); *H04L 5/0051* (2013.01)

(58) Field of Classification Search
　　 None
　　 See application file for complete search history.

(56) References Cited

U.S. PATENT DOCUMENTS

| | | | |
|---|---|---|---|
| 10,285,156 B2 | 5/2019 | Kumar | |
| 2018/0295600 A1* | 10/2018 | Kumar | H04L 5/0051 |
| 2019/0207663 A1* | 7/2019 | Shimezawa | H04B 17/309 |
| 2019/0281588 A1 | 9/2019 | Zhang | |
| 2021/0050978 A1* | 2/2021 | Manolakos | H04L 5/0051 |
| 2022/0353714 A1* | 11/2022 | Fu | H04B 7/1853 |

(Continued)

FOREIGN PATENT DOCUMENTS

| | | |
|---|---|---|
| CN | 112449370 A | 3/2021 |
| CN | 112567841 A | 3/2021 |

(Continued)

OTHER PUBLICATIONS

3GPP Draft; RP-210530, 3rd Generation Partnership Project (3GPP), Mobile Competence Centre; 650, Route Des Lucioles; F-06921 Sophia-Antipolis Cedex; France, Mar. 15, 2021 (Mar. 15, 2021), XP051985886, paragraphs C.2.2.2.2 to C.2.2.3.1 and C.2.2.5.1 to C.2.2.7.2.

(Continued)

*Primary Examiner* — Idowu O Osifade

(74) *Attorney, Agent, or Firm* — BAYES PLLC

(57) ABSTRACT

A wireless communication method, a terminal device and a network device are provided. The terminal device receives a processing indicator from a network device, the processing indicator describing one or more details of a dynamically configured measurement gap that is aperiodic. The terminal device obtains location measurements according to the dynamically configured measurement gap, the location measurements corresponding to a current geographic location of the terminal device.

15 Claims, 9 Drawing Sheets

(56)                   References Cited

U.S. PATENT DOCUMENTS

| | | | | | |
|---|---|---|---|---|---|
| 2023/0164735 A1* | 5/2023 | Si | .......................... | H04L 5/0091 | |
| | | | | 455/456.1 | |
| 2023/0327731 A1* | 10/2023 | Hu | ......................... | H04B 17/27 | |
| | | | | 370/329 | |

FOREIGN PATENT DOCUMENTS

| | | | |
|---|---|---|---|
| EP | 3837903 A1 | 6/2021 | |
| WO | 2019193194 A1 | 10/2019 | |

OTHER PUBLICATIONS

Moderator (Intel Corporation et al: "Outcome of RAN WG1 E-mail Discussion [102-e-Post-NR-ePos-01]", 3GPP Draft; R1-2007486, 3rd Generation Partnership Project (3GPP), Mobile Competence Centre; 650, Route Des Lucioles; F-06921 Sophia-Antipolis Cedex; France, vol. RAN WG1, No. e-Meeting; Aug. 17, 2020-Aug. 28, 2020, Oct. 24, 2020 (Oct. 24, 2020), XP051946410, paragraphs 8.1.2.1.2 to 8.1.2.9.2 and 8.2.2.5.2 to 8.2.2.1.6.

VIVO: "Evaluation of NR positioning performance", 3GPP Draft; R1-2007665, 3rd Generation Partnership Project (3GPP), Mobile Competence Centre; 650, Route Des Lucioles; F-06921 Sophia-Antipolis Cedex; France, vol. RAN WG1, No. e-Meeting; Oct. 26, 2020-Nov. 13, 2020, Oct. 17, 2020 (Oct. 17, 2020), XP051939827, paragraphs 3.2.2 to 4.2.2.

Moderator (CATT): "FL Summary #2 for Potential Positioning Enhancements", 3GPP Draft; R1-2009366, 3rd Generation Partnership Project (3GPP), Mobile Competence Centre; 650, Route Des Lucioles; F-06921 Sophia-Antipolis Cedex; France, vol. RAN WG1, No. e-meeting; Oct. 26, 2020-Nov. 13, 2020, Oct. 29, 2020 (Oct. 29, 2020), XP051948477, paragraphs 5.4 and 5.7.

Supplementary European Search Report in the European application No. 22798733.6, mailed on Jul. 5, 2024. 10 pages.

Vivo. "Discussion on Potential Positioning Enhancements", 3GPP TSG RAN WG1 #103-e R1-2007666, Nov. 13, 2020 (Nov. 13, 2020),3.3.1 On demand PRS, 49 pages.

International Search Report in the international application No. PCT/IB2022/054046, mailed on Aug. 16, 2022, 4 pages.

Written Opinion of the International Search Authority in the international application No. PCT/IB2022/054046, mailed on Aug. 16, 2022, 4 pages.

\* cited by examiner

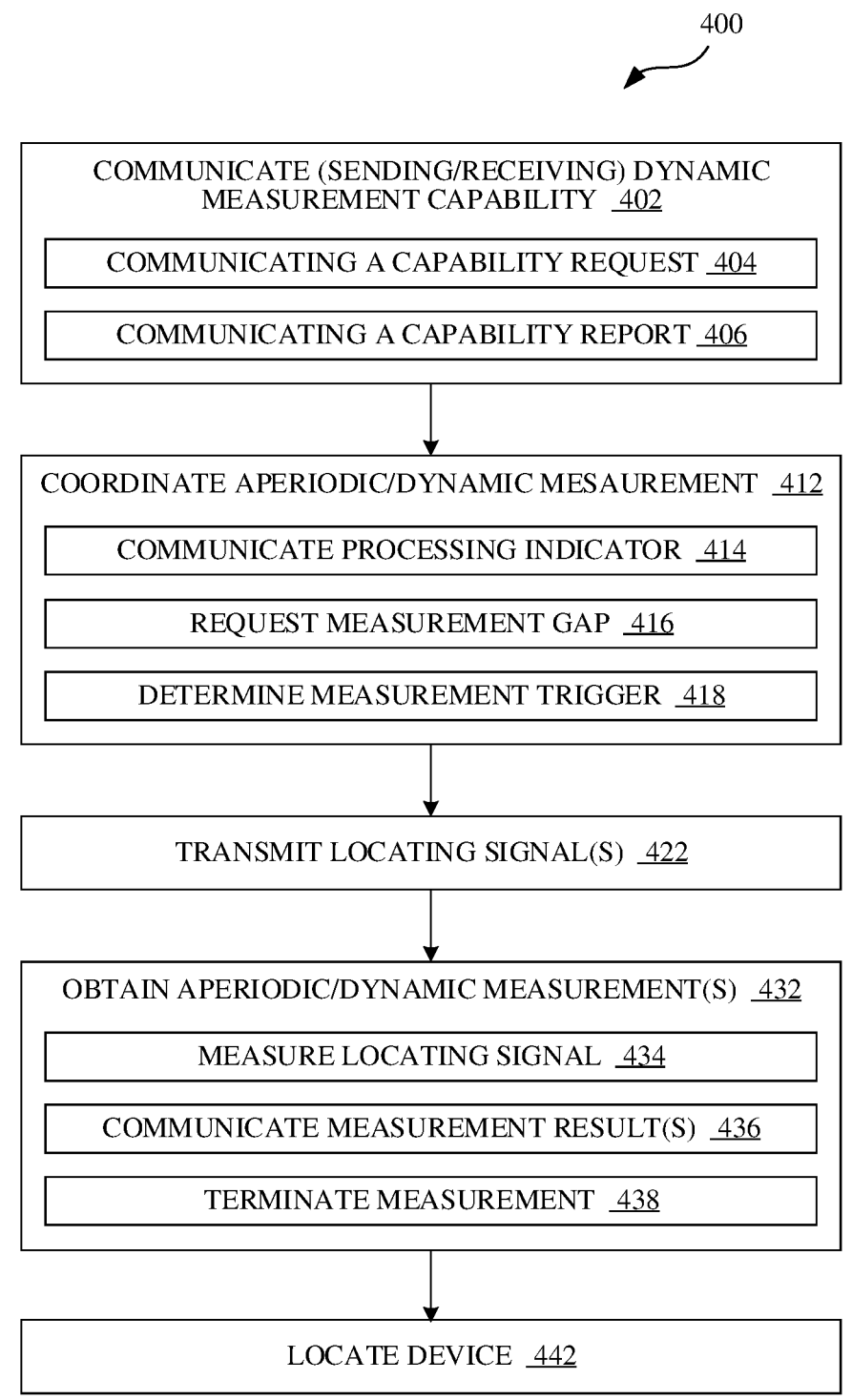

400

COMMUNICATE (SENDING/RECEIVING) DYNAMIC MEASUREMENT CAPABILITY  402

COMMUNICATING A CAPABILITY REQUEST 404

COMMUNICATING A CAPABILITY REPORT 406

COORDINATE APERIODIC/DYNAMIC MESAUREMENT  412

COMMUNICATE PROCESSING INDICATOR  414

REQUEST MEASUREMENT GAP  416

DETERMINE MEASUREMENT TRIGGER  418

TRANSMIT LOCATING SIGNAL(S)  422

OBTAIN APERIODIC/DYNAMIC MEASUREMENT(S)  432

MEASURE LOCATING SIGNAL  434

COMMUNICATE MEASUREMENT RESULT(S)  436

TERMINATE MEASUREMENT  438

LOCATE DEVICE  442

FIG. 4

TERMINAL DEVICE 500

PROCESSOR
510

MEMORY
520

POSITIONING MEASUREMENT MECHANISM AND METHODS OF OPERATING THE SAME

CROSS-REFERENCE TO RELATED APPLICATIONS

This application is a continuation of International Patent Application No. PCT/IB2022/054046 filed on May 2, 2022, which claims the benefit of priority to U.S. Provisional Patent Application No. 63/183,400 filed on May 3, 2021. The disclosures of these applications are incorporated herein by reference in their entireties.

BACKGROUND

Rapid growth in computing technology is creating a greater demand for data communication. The increasing demand in turn drives further growth in communication technology. One such technological advance corresponds to location-based services (LBSs) and/or associated devices, systems, algorithms, etc. The LBS allows a mobile computing device (e.g., a smart phone or a tablet) to obtain additional services, features, and/or information based on or relevant to the real-time location of the mobile device. For example, the LBS can include real-time turn-by-turn navigation, location-based advertising, social networking services, tracking systems, and the like. However, the rapid growth is also increasing demands for accuracy, increased granularity, faster response, parallel processing, and the like.

SUMMARY

The present disclosure relates to the communications field, and more specifically, to a wireless communication method, a terminal device and a network device.

A first aspect of the present disclosure provides a wireless communication method, which includes the following operations. A terminal device receives a processing indicator from a network device, herein the processing indicator describes one or more details of a dynamically configured measurement gap that is aperiodic. The terminal device obtains location measurements according to the dynamically configured measurement gap, herein the location measurements correspond to a current geographic location of the terminal device.

A second aspect of the present disclosure provides a terminal device, which includes a transceiver and a processor. The transceiver is configured to receive a processing indicator from a network device, herein the processing indicator describes one or more details of a dynamically configured measurement gap that is aperiodic. The processor is configured to obtain location measurements according to the dynamically configured measurement gap, wherein the location measurements correspond to a current geographic location of the terminal device.

A third aspect of the present disclosure provides a network device, which includes a transceiver and a processor. The transceiver is configured to send a processing indicator to a terminal device, herein the processing indicator describes one or more details of a dynamically configured measurement gap that is aperiodic. The processor is configured to obtain location measurements, herein the location measurements correspond to a current geographic location of the terminal device.

BRIEF DESCRIPTION OF THE DRAWINGS

To describe the technical solutions in the implementations of the present technology more clearly, the following briefly describes the accompanying drawings. The accompanying drawings show merely some aspects or implementations of the present technology, and a person of ordinary skill in the art may still derive other drawings from these accompanying drawings without creative efforts.

FIG. 4 illustrates a flowchart of an example method in accordance with one or more implementations of the present technology.

DETAILED DESCRIPTION

Figure 1:
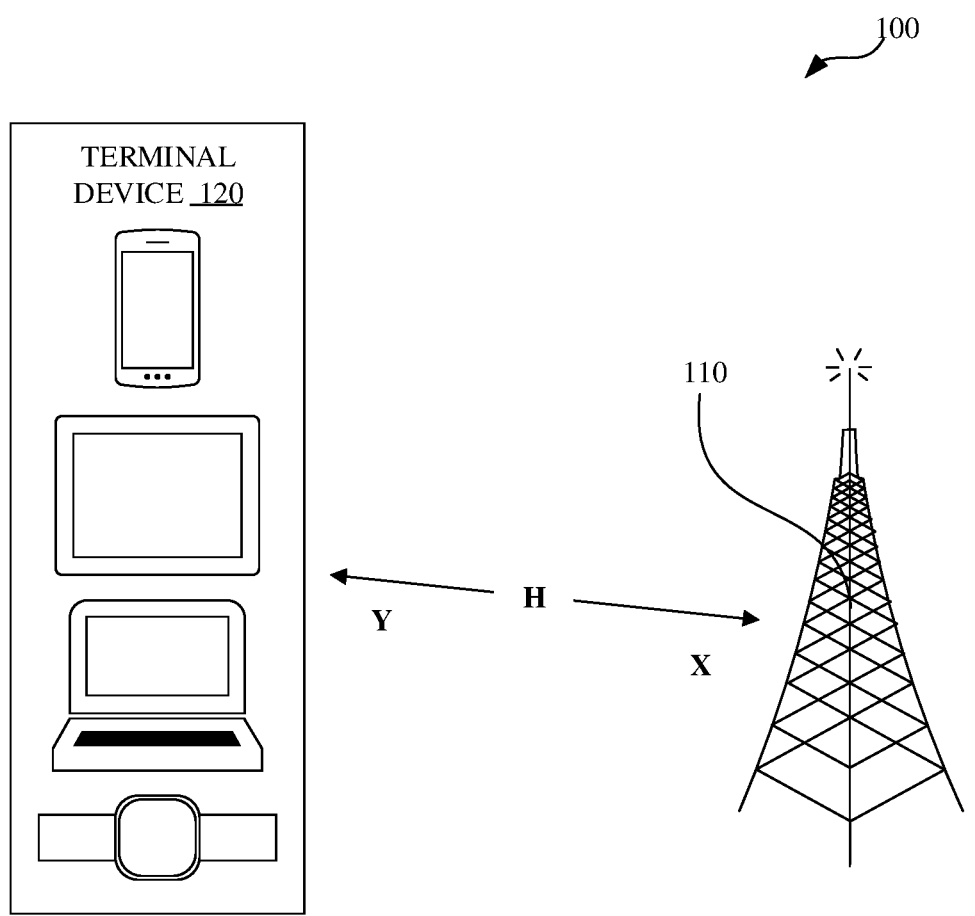
FIG. 1 illustrates a wireless communication system in accordance with one or more implementations of the present technology.

The following describes the technical solutions in the one or more implementations of the present technology. A wireless communication system can implement location-based functions using dynamically configured/scheduled measurement gaps. The communication system can determine a real-time geographic location or a current location of a terminal device based on one or more measurements made by the terminal device according to the dynamically configured measurement gaps. In some implementations, the terminal device can send a capability report that identifies dynamic measurement gap processing capabilities to one or more network devices and/or a communications network. The communications network can send a processing indicator that describes one or more details for measuring a targeted signal (e.g., positioning reference signal) without a fixed measurement gap.

Some conventional systems use the fixed measurement gap that (1) lasts for a predetermined duration (e.g., 4 mS) and (2) repeats according to a fixed frequency (every 100 mS). Accordingly, conventional UEs are required to way for the fixed measurement gap, which provides a bottleneck and increases the processing latency for positioning measurement at the physical layer.

In contrast, implementations of the present technology can use a capability report, a processing indicator, a corresponding trigger, and/or a gap request to dynamically configure and coordinate measurement gaps and/or the corresponding targeted signals. Accordingly, the terminal device and the communications network can dynamically schedule and/or coordinate aperiodic or on-demand measurement gaps. As a result, the communications system can reduce the processing latency and provide faster, more relevant, and more granular location information for the LBS.

In the following description, numerous specific details are set forth to provide a thorough understanding of the presently described technology. In other implementations, the techniques introduced here can be practiced without these specific details. In other instances, well-known features, such as specific functions or routines, are not described in detail in order to avoid unnecessarily obscuring the present technology. References in this description to "an implementation," "one implementation," or the like mean that a particular feature, structure, material, or characteristic being described is included in at least one implementation of the described technology. Thus, the appearances of such phrases in this specification do not necessarily all refer to the same implementation. On the other hand, such references are not necessarily mutually exclusive either. Furthermore, the particular features, structures, materials, or characteristics can be combined in any suitable manner in one or more implementations. It is to be understood that the various implementations shown in the figures are merely illustrative representations and are not necessarily drawn to scale.

Several details describing structures or processes that are well-known and often associated with communication systems and subsystems, but that can unnecessarily obscure some significant aspects of the disclosed techniques, are not set forth in the following description for purposes of clarity. Moreover, although the following disclosure sets forth several implementations of different aspects of the present technology, several other implementations can have different configurations or different components than those described in this section. Accordingly, the disclosed techniques can have other implementations with additional elements or without several of the elements described below.

Many implementations or aspects of the technology described below can take the form of computer- or processor-executable instructions, including routines executed by a programmable computer or processor. Those skilled in the relevant art will appreciate that the described techniques can be practiced on computer or processor systems other than those shown and described below. The techniques described herein can be implemented in a special-purpose computer or data processor that is specifically programmed, configured, or constructed to execute one or more of the computer-executable instructions described below. Accordingly, the terms "computer" and "processor" as generally used herein refer to any data processor. Information handled by these computers and processors can be presented at any suitable display medium, including a liquid crystal display (LCD). Instructions for executing computer- or processor-executable tasks can be stored in or on any suitable computer-readable medium, including hardware, firmware, or a combination of hardware and firmware. Instructions can be contained in any suitable memory device, including, for example, a flash drive and/or other suitable medium.

The terms "coupled" and "connected," along with their derivatives, can be used herein to describe structural relationships between components. It should be understood that these terms are not intended as synonyms for each other. Rather, in particular implementations, "connected" can be used to indicate that two or more elements are in direct contact with each other. Unless otherwise made apparent in the context, the term "coupled" can be used to indicate that two or more elements are in either direct or indirect (with other intervening elements between them) contact with each other, or that the two or more elements cooperate or interact with each other (e.g., as in a cause-and-effect relationship, such as for signal transmission/reception or for function calls), or both. The term "and/or" in this specification is only an association relationship for describing the associated objects, and indicates that three relationships may exist, for example, A and/or B may indicate the following three cases: A exists separately, both A and B exist, and B exists separately. In addition, the character "/" in this specification generally indicates an "or" relationship between the associated objects.

Suitable Environments

FIG. 1 illustrates a wireless communication system 100 in accordance with one or more implementations of the present technology. As shown in FIG. 1, the wireless communication system 100 can include a network device 110. The network device 110 can include circuitry configured to provide communication coverage for a specific geographic area. Some examples of the network device 110 can include: a base transceiver station (Base Transceiver Station, BTS), a NodeB (NodeB, NB), an evolved Node B (eNB or eNodeB), a Next Generation NodeB (gNB or gNode B), a Wireless Fidelity (Wi-Fi) access point (AP). Additional examples of the network device 110 can include a relay station, an access point, an in-vehicle device, a wearable device, and the like. The network device 110 can include other wireless connection devices for communications networks such as: a Global System for Mobile Communications (GSM) network, a Code Division Multiple Access (CDMA) network, a Wideband CDMA (WCDMA) network, a Long-Term Evolution (LTE) network, a cloud radio access network (Cloud Radio Access Network, CRAN), an Institute of Electrical and Electronics Engineers (IEEE) 802.11-based networks (e.g., a WiFi network), an Internet of Things (IoT) network, a device-to-device (D2D) network, a next-generation network (e.g., a Fifth Generation (5G) network), a future evolved public land mobile network (Public Land Mobile Network, PLMN), or the like. Optionally, a 5G system or network may be further referred to as a new radio (New Radio, NR) system or network. The network device 110 can functionally correspond to a Transmission/Reception Point (TRP).

Additionally or alternatively, the wireless communication system 100 can include a terminal device 120. The terminal device 120 can be an end-user device configured to facilitate wireless communication. The terminal device 120 can be configured to wirelessly connect to the network device 110 (via, e.g., a wireless channel) according to one or more corresponding communication protocols/standards. The terminal device 120 may be mobile or fixed. The terminal device 120 can be an access terminal, a user equipment (User Equipment, UE), a user unit, a user station, a mobile site, a mobile station, a remote station, a remote terminal, a mobile device, a user terminal, a terminal, a wireless communications device, a user agent, or a user apparatus. Some examples of the terminal device 120 can include: a cellular phone, a smart phone, a cordless phone, a Session Initiation Protocol (SIP) phone, a wireless local loop (Wireless Local Loop, WLL) station, a personal digital assistant (PDA), a handheld device having a wireless communication function, a computing device or another processing device connected to a wireless modem, an in-vehicle device, a wearable device, an IoT device, a terminal device in a future 5G network, a terminal device in a future evolved PLMN, or the like.

For illustrative purposes, FIG. 1 illustrates the wireless communication system 100 via the network device 110 and the terminal device 120. However, it is understood that the wireless communication system 100 can include additional/other devices, such as additional instances of the network device 110 and/or the terminal device 120, a network controller, a mobility management entity, etc.

Positioning Measurement

Figure 2:
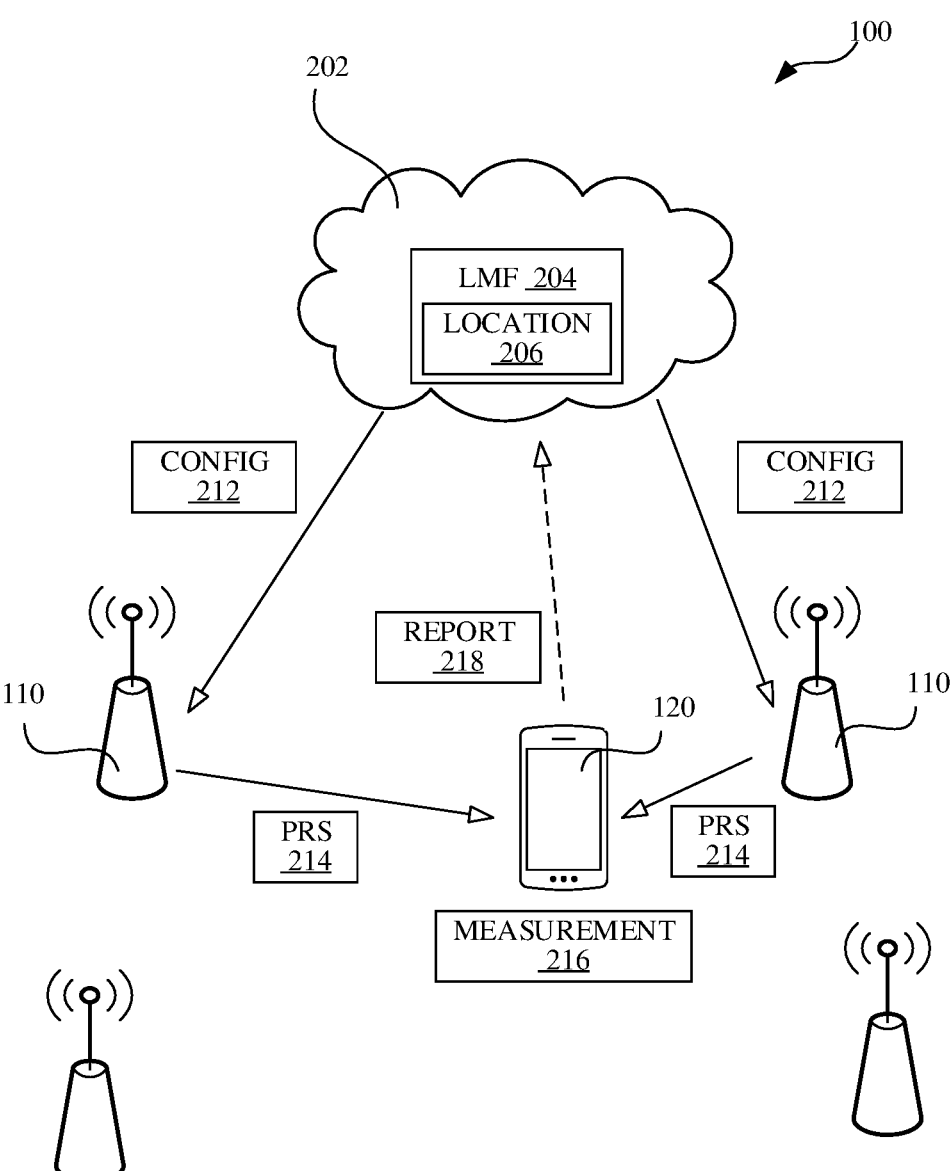
FIG. 2 illustrates an example position measurement process in accordance with one or more implementations of the present technology.

The communication system 100 can determine a real-time geographic location of the terminal device 120 based on one or more measurements made by the terminal device 120. The terminal device 120 perform and report the measurement according to a position measurement process. FIG. 2 illustrates an example position measurement process in accordance with one or more implementations of the present technology.

As illustrated in FIG. 2, the communication system 100 can include a communications network 202 (e.g., a set of servers, nodes, and/or network functions) communicatively coupled to a set of the network devices 110. One or more of the network devices 110 can wirelessly couple to the terminal device 120. The communications network 202 can include a location server 204 performing a location management function (LMF). In some implementations, the LMF 204 can manage or oversee the position measurement process, such as by coordinating operations of one or more devices for the measurement process and/or by tracking a current location 206 of the terminal device 120.

As an illustrative example, the LMF 204 can provide one or more configuration parameters 212 to the network devices 110 for scheduling and/or transmitting locating signals (e.g., downlink (DL) positioning reference signal (PRS) resources 214). The network devices 110 can act as TRPs and transmit the PRS resources 214 according to the configuration parameters 212. In some implementations, a subset of the network devices 110 can be configured to mute, repeat, or transmit the PRS to the terminal device 120 over multiple symbols that can be aggregated to accumulate power.

The terminal device 120 can derive a resource measurement 216 based on measuring the PRS resource 214. For example, the terminal device 120 can measure a DL reference signal time difference (RSTD) based on the PRS resources 214 transmitted by two or more network devices 110. Other example measurements can include an uplink (UL) relative time of arrival (RTOA) measured from sounding reference signals (SRSs), DL PRS reference signal received power (RSRP), UL SRS RSRP, DL/UL angle of arrival (AOA) or angle of departure (ADD), and/or the like. The resource measurement 216 can also be measured based on signal reception-transmission (Rx-Tx) time difference relative to the terminal device 120 and/or one or more of the network device 110.

The terminal device 120 can generate a measurement report 218 based on the resource measurement 216 and send the measurement report 218 to the LMF 204. In some implementations, the LMF 204 can use the measurement report 218 to calculate the current location 206 of the terminal device 120. For example, the resource measurement 216 and the measurement report 218 can represent differences in times of signal arrival (e.g., the PRS resource 214) in UL or DL, differences in round-trip time (RTT) of communications, angle of departure or signal path for DL departure or UL arrival, and/or the like. The LMF 204 can use a corresponding calculation process (e.g., a triangulation-based method) to calculate the current location 206. Also, the LMF 204 can use an Enhanced Cell ID (E-CID) method and the corresponding identifiers of the connected network devices 110 to calculate the current location 206 of the terminal device 120.

In some implementations, the terminal device 120 can be configured (via, e.g., dl-PRS-Periodicity-and-ResourceSet-SlotOffset) with one or more DL PRS resource sets that each include one or more DL PRS resources. For each DL PRS resource set, the UE can be provided with resource periodicity and/or offset values. For example, the dl-PRS-Periodicity-and-ResourceSetSlotOffset configuration parameter can be represented as $$T_{per}^{PRS} \in 2^\mu \{4, 5, 8, 10, 16, 20, 32,$$
$$40, 64, 80, 160, 320, 640, 1280, 2560, 5120, 10240\},$$

where $\mu=0$, 1, 2, 3 for subcarrier spacings (e.g., dl-PRS-SubcarrierSpacing) of 15, 30, 60 and 120 kHz, respectively. The slot offset for the DL PRS resource set can be with respect to SFN0 slot 0. The DL PRS resources within one DL PRS resource set may be configured with the same DL PRS resource periodicity. The terminal device 120 can be further configured with one or more muting options that describe the times and/or locations where the DL PRS resource is expected to be silent or not transmitted for a DL PRS resource set. For example, one option (e.g., dl-PRS-MutingOption1) can be configured to mute each bit in a corresponding bitmap that corresponds to a configurable number provided by higher layer (via, e.g., dl-prs-MutingBitRepetitionFactor). The configurable number can represent consecutive instances of a DL PRS resource set where the included DL PRS resources are configured to be muted for the indicated instance/timing. The length of the bitmap can be {2, 4, 6, 8, 16, 32} bits. Also, for another option (e.g., dl-PRS-MutingOption2), a corresponding bitmap can indicate a single repetition index for each of the DL PRS resources within each instance of a DL PRS resource set (e.g., nr-DL-PRS-ResourceSet). The length of the bitmap is equal to the values of the higher layer parameter (e.g., dl-prs-MutingBitRepetitionFactor).

Given the configuration parameters/settings described above, the bandwidth of DL PRS resource may be outside the bandwidth of one active Bandwidth Part (BWP). Further, the subcarrier spacing used by a DL PRS resource may be different from the subcarrier spacing of an active BWP. Thus, a measurement gap may be required for the terminal device 120 to measure DL PRS resource. Accordingly, a conventional UE may be required to wait for a periodic measurement window/gap (e.g., a 4 mS window that appears every 100 mS or a different periodicity) to perform the measurement. The conventional approach can provide a bottleneck via the periodicity and increase the processing latency for positioning measurement at the physical layer.

Implementations of the present technology can correspond to the UE dynamically performing the positioning measurement (e.g., without the fixed measurement gaps). In one or more implementations, the communication system 100 (via, e.g., the network device 110, the terminal device 120, and/or the communications network 202) can define a terminal device or UE capability for measuring DL Positioning Reference Signal (PRS) resource without fixed measurement gap. The communication system 100 can use lower-layer communications or interactions to dynamically coordinate the positioning measurement. For example, the terminal device 120 can coordinate the positioning measurement by (1) using a trigger based on downlink control information (DCI), (2) activating/deactivating the measurement gap through a medium access control (MAC) layer control element (CE), and/or (3) using a measurement gap request (via, e.g., PUCCH, MAC CE, or the like). Accordingly, the computing system 100 and/or the terminal device 120 can provide many improvements over the conventional approach, such as by reducing the processing latency for positioning measurement at the physical layer, by increasing the processing efficiency, and/or by increasing the granularity/accuracy of the current location (via, e.g., more frequent or relevant updates to the tracked data).

Configuring Positioning Measurement

Figure 3A:
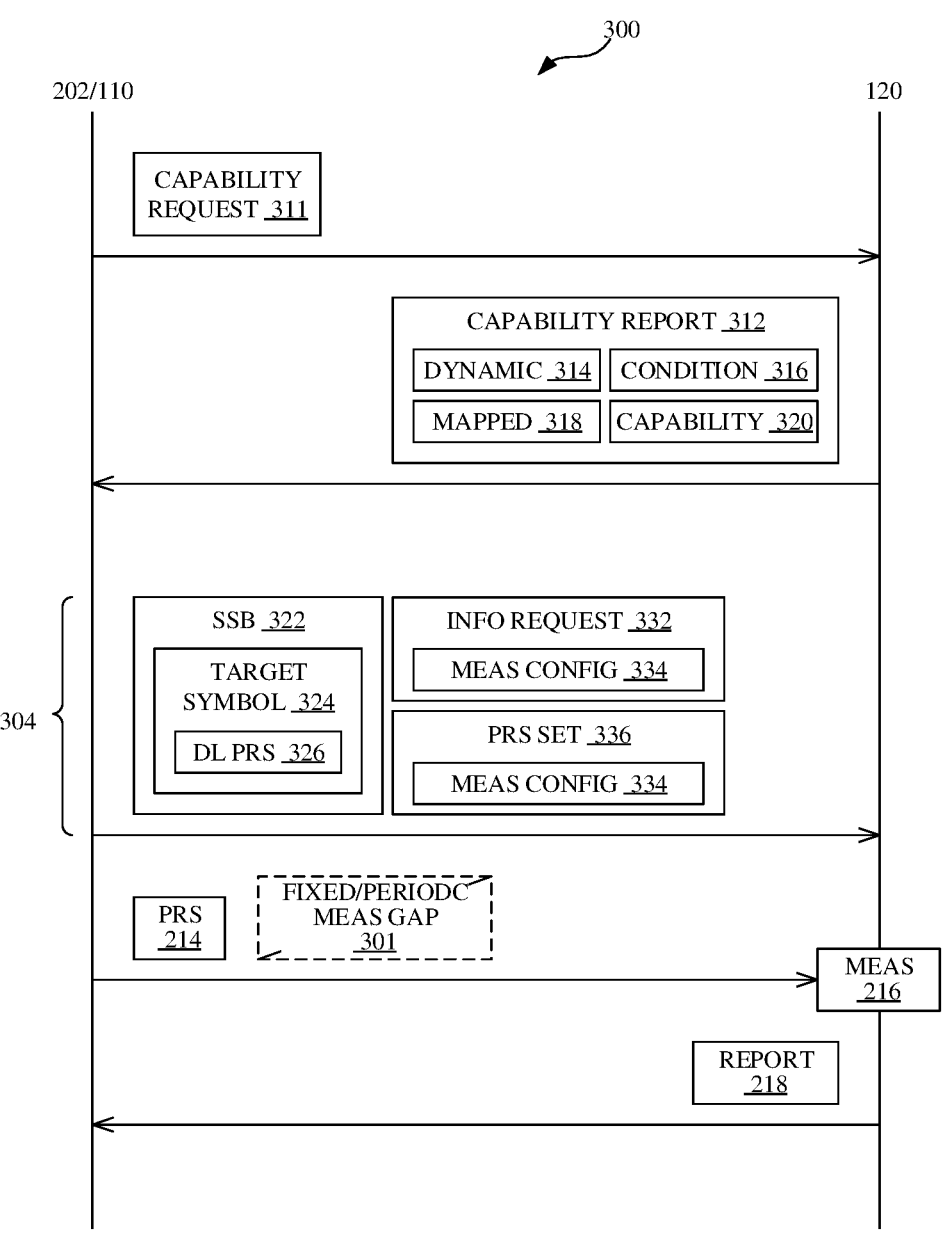
FIG. 3A illustrates an example communication in configuring a dynamic gap measurement in accordance with one or more implementations of the present technology.
Figure 3B:
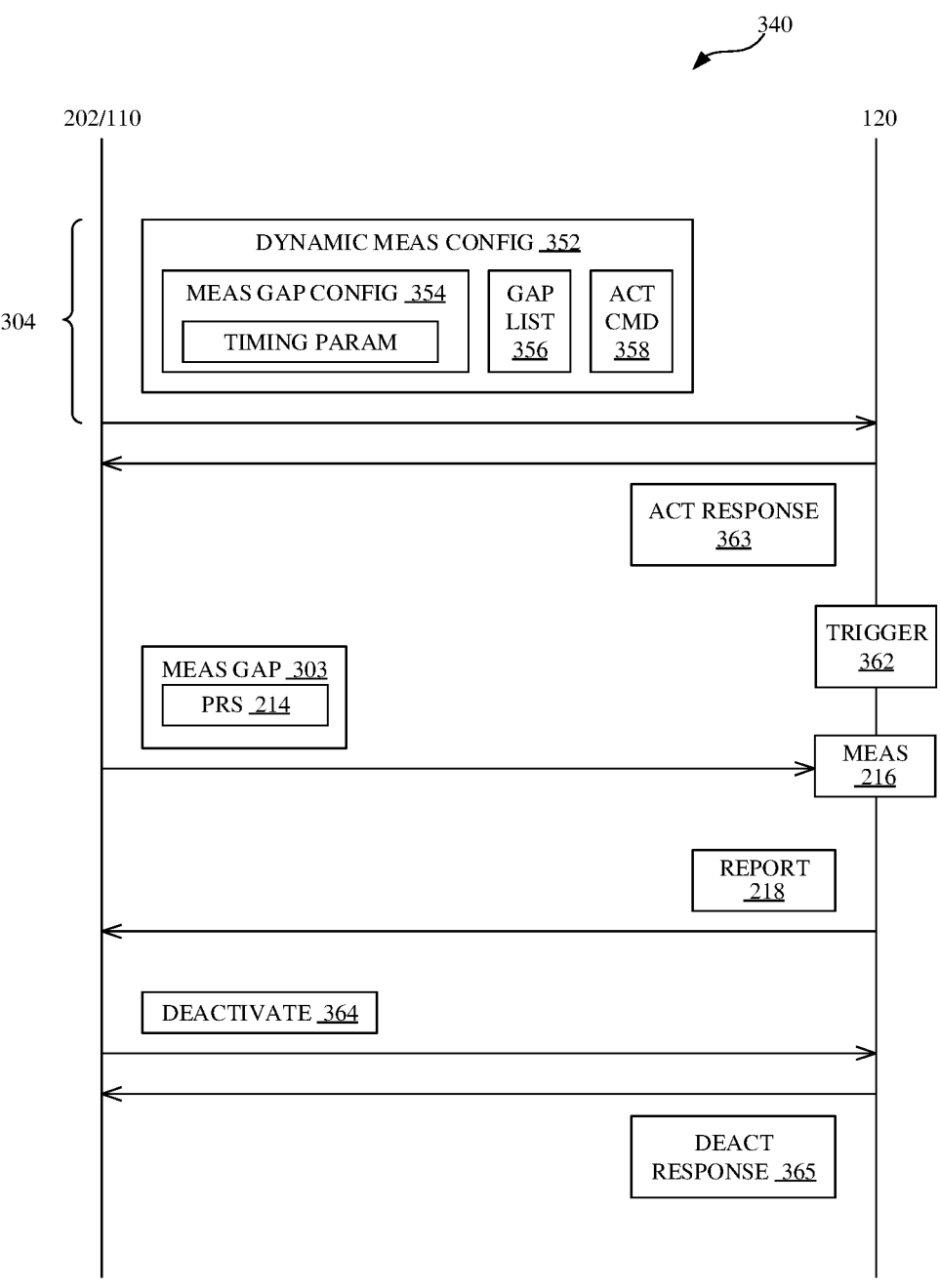
FIG. 3B illustrates another example communication in configuring a dynamic gap measurement in accordance with one or more implementations of the present technology.
Figure 3C:
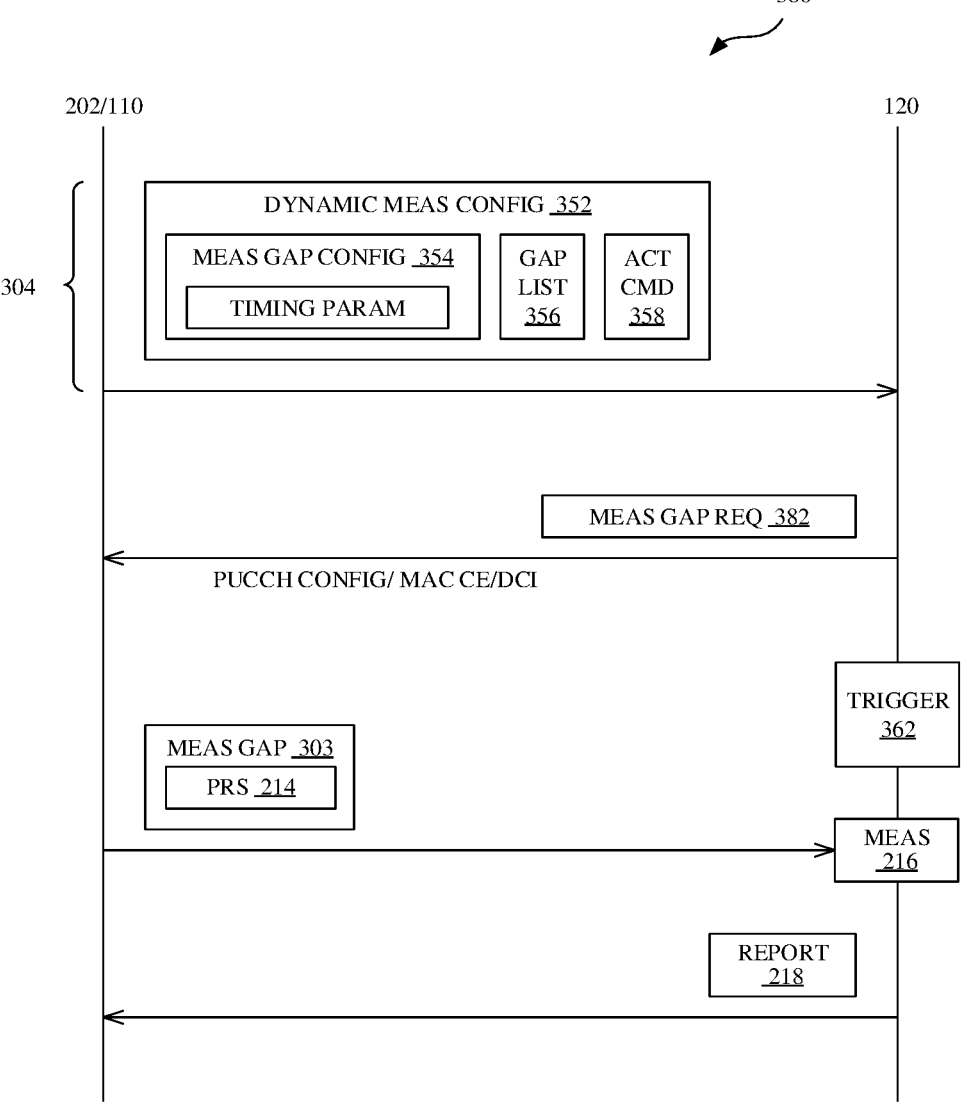
FIG. 3C illustrates yet another example communication in configuring a dynamic gap measurement in accordance with one or more implementations of the present technology.

The communication system 100 can configure the devices therein (e.g., one or more of the network devices 110, the terminal device 120, and/or the communications network 202) to perform the dynamic positioning measurements. The communication 100 can configure the devices by exchanging one or more communications between a subset of the devices, such as between the terminal device 120 and one or more of the network devices 110 and/or other devices or nodes in the communications network 202. FIGS. 3A, 3B, and 3C illustrate example communications in configuring a dynamic gap measurement in accordance with one or more implementations of the present technology.

FIG. 3A can illustrate a first example set of communications 300. For the first example set of communications 300, the network (e.g., TRPs and/or the communications network 202) can send a capability request 311 to the terminal device 120. Alternatively or additionally, the network can send the capability request 311 when a fixed measurement gap 301 (e.g., a predetermined and/or repetitive window designated for the terminal device 120 to perform the position measurement) is unconfigured. The capability request 311 can prompt the terminal device 120 to provide a capability report 312. The capability report 312 can indicate whether the terminal device 120 is configured or able to measure the DL PRS resource without the fixed measurement gap 301.

In some implementations, the capability report 312 can include a dynamic status 314 indicating that the terminal device 120 is configured to measure the DL PRS resource without the fixed measurement gap 301. The capability report 312 can additionally or separately include a conditional status 316 indicating that the terminal device 120 is configured to measure the DL PRS resource without the fixed measurement gap 301 based on a condition, such as when the numerology of DL PRS resource matches that of the active DL BWP, and the bandwidth of the DL PRS resource is within the bandwidth of the active DL BWP. Alternatively or additionally, the terminal device 120 can include in the capability report 312 a mapped status 318 that indicates a capacity to measure the DL PRS resource that is mapped on one symbol where synchronization signal block (SSB) is transmitted.

Further, in some implementations, the terminal device 120 can include in the capability report 312 a processing capability 320 when the fixed measurement gap 301 is not configured. The processing capability 320 can indicate a number/identifier of a DL PRS resource symbol that the UE is able to process during an interval (e.g., each P1 milliseconds). Additionally or alternatively, the processing capability 320 can indicate a number of slots where the UE is able to receive and process DL PRS resource during an interval (e.g., each P2 milliseconds). The processing capability 320 may separately or independently correspond to each bandwidth.

Accordingly, the communication system 100 can use the capability report 312 to identify the capabilities or configurations of the terminal device 120 for measuring/processing the DL PRS resources without the fixed measurement gap 301. The communication system 100 can use the information in the capability report 312 to transmit (via the network devices 110) the DL PRS resource 214. The terminal device 120 can further leverage the reported capabilities to generate the resource measurement 216, which can be sent to the LMF 204 of FIG. 2 via the corresponding measurement report 218 as described above.

In dynamically processing the positioning measurements, the communication system 100 can provide the terminal device 120 with a processing indicator 304. For example, the network can map the DL PRS resource 326 on a target symbol 324 where SSB is transmitted. The processing indicator 304 can include an SSB mapping indicator 322 that indicates such mapping.

In some implementations, the processing indicator 304 can indicate to the terminal device 120 to process according to priority, such as to process the DL PRS resource 326 with higher priority or SSB with higher priority when the DL PRS resource 326 and SSB are mapped on the target symbol 324. The TRP can provide a higher-layer indicator to the terminal device 120. The higher-layer parameter can notify the terminal device 120 to measure the DL PRS resource 326 or SSB on the target symbols 324 where both the DL PRS resource 326 and SSB are mapped. Additionally or alternatively, the network can use a location information request 332 to indicate a measurement configuration 334. Some examples of the measurement configuration 334 can include a parameter corresponding to different types of measurements, such as DL time difference of arrival (DTOA), DL-AOD measurement, and multi-RTT measurement. The different types of measurements may be indicated in the location information request 332 by IE NR-DL-TDOA-RequestLocationInformation, IE NR-DL-AoD-RequestLocationInformation, and IE NR-Multi-RTT-RequestLocationInformation, respectively. The location information request 332 can notify the terminal device 120 to process the DL PRS resource with higher priority. The network can use the location information request 332 to indicate the measurement configuration 334 for notifying the terminal device 120 to measure the DL PRS resource 326 or SSB on the target symbols 324 where both DL PRS resource and SSB are mapped.

Additionally or alternatively, the processing indicator 304 can correspond to the measurement configuration 334 for a DL PRS resource set 336. The measurement configuration 334 can include a parameter notifying the terminal device 120 to measure the DL PRS resource 326 (e.g., within the set 336 or a different set) or SSB from the symbols where both DL PRS resource and SSB are mapped. The measurement configuration parameter 334 can further notify the terminal device 120 to process the DL PRS resource in that DL PRS resource set with higher priority.

Accordingly, the terminal device 120 can use the processing indicator 304 in measuring/processing the DL PRS resources without the fixed measurement gap 301. In other words, the terminal device 120 can measure the DL PRS resource 214 and generate the resource measurement 216 according to the processing indicator 304. The terminal device 120 can provide the resource measurement 216 to the LMF 204 of FIG. 2 via the corresponding measurement report 218 as described above.

FIG. 3B can illustrate a second example set of communications 340 that includes the processing indicator 304 for notifying the terminal device 120 regarding details for a dynamically configured measurement gap 303. The processing indicator may be communicated over a processing layer (e.g., the MAC layer or via downlink control information (DCI)). For example, the network (e.g., the network 220 and/or the network devices 110) can send the processing indicator 304 as a dynamic measurement configuration 352 that describes one or more details used to dynamically measure the location signals and/or for coordinating the dynamic/aperiodic measurement gap.

As an illustrative example, the dynamic measurement configuration 352 can include a measurement gap configuration 354. The measurement gap configuration 354 can identify one of the measurement gap configurations that are configured in higher layer (e.g., RRC). The terminal device 120 can determine a measurement trigger 362 based on the measurement gap configuration 354. In some implementations, the measurement gap configuration 354 can include a timing parameter, such as a slot offset, a measurement gap length, a measurement gap repetition period, a number of measurement gap repetitions, a measurement gap timing advance, or the like. For example, assuming that (1) the processing indicator 304 was received by the terminal device 120 at a time slot n, the terminal device 120 can determine the measurement trigger 362 as a delay duration m that is measured from n. Accordingly, the terminal device 120 can determine that the dynamically configured measurement gap 303 starts from slot n+m. In other implementations, the timing parameters for the measurement gap may be predetermined, such as according to a predetermined standard or protocol.

Additionally or alternatively, the processing indicator 304 can include a gap list 356 and/or a corresponding activation command 358. The network can use the gap list 356 to provide (via, e.g., a higher layer communication, such as a RRC message) the terminal device 120 with a set of K measurement gaps. The network can subsequently send (e.g., via, a MAC CE) the activation command 358 that selects and activates one of the measurement gaps in the set of K. In response to receiving the activation command 358, the terminal device 120 may transmit an activation response 363. For example, the terminal device 120 transmit a PUCCH with HARQ-ACK information in slot n that corresponds to the PDSCH carrying the activation command 358. The terminal device 120 can determine that the dynamically configured measurement gap 303 starts, ends, and/or repeats according to the predetermined or provided timing parameter. For example, the terminal device 120 can determine that the dynamically configured measurement gap 303 starts from a first slot following slot $$n + 3N_{slot}^{subframe,\mu}.$$

The term μ can represent the SCS configuration for the PUCCH. The terminal device 120 can determine the trigger 362 based on the determined start of the dynamically configured measurement gap 303. Further, the terminal device 120 can determine that the dynamically configured measurement gap 303 may repeat according to a number of repetitions indicated by the timing parameter and process the measurement accordingly.

The terminal device 120 can measure the PRS 214 according to the corresponding dynamically configured measurement gap 303. Accordingly, the terminal device 120 can derive the resource measurement 216 and send the measurement report 218.

In some implementations, the network can send a deactivation command 364 (e.g., a MAC CE command) to the terminal device 120 to deactivate the activated measurement gap configuration. The terminal device 120 can send a deactivation response 365, such as a PUCCH with HARQ-ACK information in slot n corresponding to the PDSCH carrying the deactivation command Similar to the activation, the communication system 100 can deactivate the gap starting from the first slot the first slot following $$n + 3N_{slot}^{subframe,\mu}.$$

FIG. 3C can illustrate a third example set of communications 380 that includes the processing indicator 304 for notifying the terminal device 120 regarding details for sending a measurement gap request 382. The communication system 100 may provide the dynamic measurement configuration 352 to the terminal device 120 for sending the measurement gap request 382. In some implementations the dynamic measurement configuration 352 can correspond to a PUCCH configuration or other communication details (regarding, e.g., MAC CE, DCI, or the like). Accordingly, the terminal device 120 can use the configured PUCCH or other communication settings to send the measurement gap request 382. Additionally or alternatively, the dynamic measurement configuration 352 may include the gap list 356 that specifies a list of K≥1 measurement gap configurations. The terminal device 120 can use the measurement gap request 382 to specify one of the K measurement gap configurations in the gap list 356. Further, the terminal device 120 can use the measurement gap request 382 to indicate details regarding the requested measurement gap. Some examples of the indicated details may include measurement gap length, slot offset of measurement gap, measurement gap repetition period, number of measurement gap repetitions, and/or the point A of the DL PRS resource.

In other embodiments, the communication system 100 can use a higher layer communication (e.g., RRC) to send the dynamic measurement configuration 352 and/or the gap list 356 to the terminal device 120. For such settings, the terminal device 120 can send the measurement gap request 382 as a MAC CE message to request one of the configurations included in the gap list 356. Additionally or alternatively, the terminal device 120 can include in the MAC CE message details regarding the requested measurement gap, such as the point A of DL PRS resource, the measurement gap length, the slot offset of measurement gap, and/or the measurement gap repetition.

The communication system 100 and/or the terminal device 120 can implement the dynamically configured measurement gap 303 according to the requested parameters. The terminal device 120 may determine and implement the measurement trigger 362 and measure the PRS 214 according to the requested parameters. The terminal device 120 can derive the resource measurement 216 and send the measurement report 218. The communication system 100 may communicate deactivations and/or confirmations as described above.

For illustrative purposes, the first, second and third sets of communications are shown separately. However, it is understood that the first, second, third sets of communications, and/or portions thereof can be combined differently.

Example Operational Flow

FIG. 4 is a flowchart of an example method 400 in accordance with one or more implementations of the present technology. The method 400 can be implemented by a system (e.g., the communication system 100 of FIG. 1 and/or one or more devices therein, such as the terminal device 120 of FIG. 1, the network device 110 of FIG. 1, and/or the network 202 of FIG. 2). The method 400 is for dynamically performing location measurements and/or coordinating associated aperiodic measurement gaps. The method 400 can correspond to one or more of aspects the communication sets described above, such as the first set of communications, the second set of communications, and/or the third set of communications, or a combination thereof.

The method 400 can include, at block 402, communicating (e.g., sending and receiving) dynamic measurement capabilities between the wireless communications network 202 and the terminal device 120. For example, the network can send a capability request (e.g., the capability request 311 of FIG. 3A) to the terminal device 120 as illustrated at block 404, and the terminal device 120 can send a capability report (e.g., the capability report 312 of FIG. 3A) to the network. The communicated capability report can indicate details regarding a capacity of the terminal device 120 to measure the PRS resource 214 of FIG. 2 without a periodic measurement gap (e.g., the fixed measurement gap 301 of FIG. 3A).

The method 400 can further include, at block 412, coordinating aperiodic/dynamic measurements for locating the terminal device 120. For example, at block 414, the network can communicate a processing indicator (e.g., the processing indicator 304 of FIGS. 3A, 3B, and/or 3C) between the network and the terminal device 120. Also, at block 416, the terminal device 120 can request one or more measurement gaps (via, e.g., the measurement gap request 382 of FIG. 3). Moreover, at block 418, the terminal device 120 can determine one or more measurement triggers for initiating the location-based measurements. The processing indicator 304 can describe one or more details of the dynamically configured measurement gap 303 of FIG. 3B that is aperiodic. The processing indicator 304 can correspond to or function as a response to the capability report. The processing indicator 304 can include the SSB mapping indicator 322 of FIG. 3A, the location information request 332 of FIG. 3A, the DL PRS resource set 336 of FIG. 3A, the dynamic measurement configuration 352 of FIGS. 3B and 3C, a timing parameter, and/or the like.

In some implementations, the network can determine one or more dynamic PRS processing configurations according to the capability report 312 and/or other real-time network conditions. The network can generate and send the processing indicator 304 that represents the one or more dynamic PRS processing configurations. The processing indicator 304 can be received by the terminal device 120. The terminal device 120 may further send the measurement gap request 382 to the network based on or in response to the processing indicator 304. For example, the processing indicator 304 can include measurement gap list 356 that represents a predetermined set of PRS measurement configurations, and the measurement gap request 382 can include a selected configuration from the measurement gap list 356. In some implementations, the measurement gap request 382 can be sent as a communication targeting a lower layer (e.g., MAC CE, DCI, or the like) than a layer associated with the communication of the processing indicator 304 (e.g., RRC). Additionally, the coordination process can include communicating the activation command 358 for initiating the dynamically configured measurement gap as described in the processing indicator 304.

At block 422, the communication system 100 (via, e.g., the network devices 110, such as one or more TRPs) can transmit the locating signal(s). For example, the communication system 100 can transmit the PRS resource 214 as indicated by the processing indicator 304 and/or the measurement gap request 382.

At block 432, the communication system 100 can obtain the aperiodic/dynamic measurement(s) that correspond to the current geographic location 206 of the terminal device 120. For example, at block 434, the terminal device 120 can measure the locating signals, such as according to the dynamically configured measurement gap 303 and/or outside of the fixed measurement gap 301. The terminal device 120 can generate the resource measurements 216 according to the coordinated parameters. Also, at block 436, the communication system 100 can communicate the measurement(s) between the terminal device 120 and the network, such as by sending the measurement report 218 of FIG. 2 from the terminal device 120 to the network. In some implementations, the communication system 100 can terminate the measurement process as illustrated at block 438.

At block 442, the communication system 100 can use the obtained measurement(s) to locate the terminal device 120. For example, the LMF 204 can process the measurement report 280, such as by triangulation, to calculate the current location 206 of the terminal device 120 for LBS.

Example Devices and Systems

Figure 5:
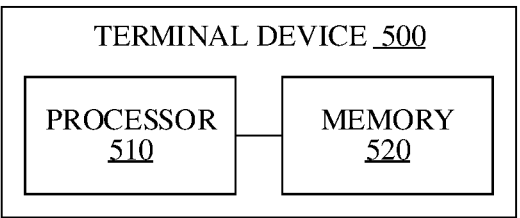
FIG. 5 illustrates a schematic block diagram of a terminal device in accordance with one or more implementations of the present disclosure.
Figure 6:
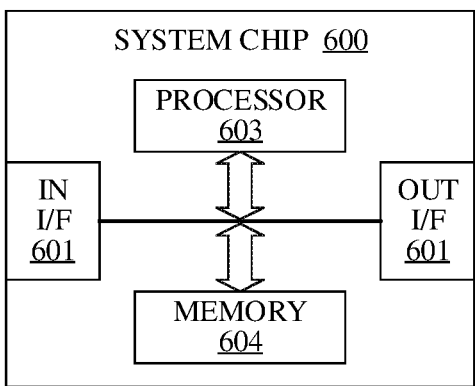
FIG. 6 illustrates is a schematic block diagram of a system chip in accordance with one or more implementations of the present disclosure.
Figure 7:
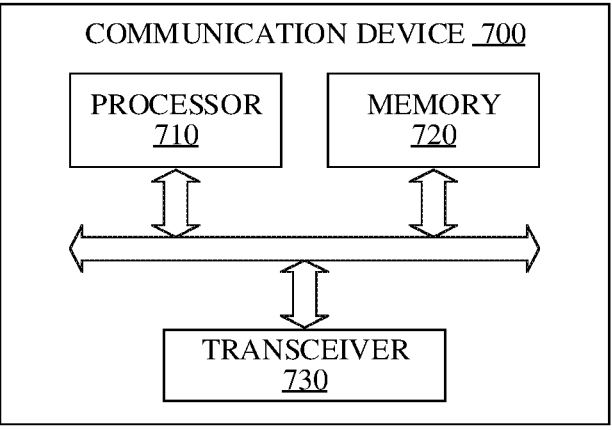
FIG. 7 illustrates a schematic block diagram of a communications device in accordance with one or more implementations of the present disclosure.

FIGS. 5-7 illustrate example devices and systems that include or incorporate the dynamic positioning measurement mechanism described above. FIG. 5 is a schematic block diagram of a terminal device 500 (e.g., an instance of the terminal device 120 of FIG. 1) in accordance with one or more implementations of the present technology. As shown in FIG. 5, the terminal device 500 includes a processing unit 510 (e.g., a DSP, a CPU, a GPU, etc.) and a memory 520. The processing unit 510 can be configured to implement instructions that correspond to the method 400 of FIG. 4 and/or other aspects of the implementations described above.

FIG. 6 is a schematic block diagram of a system chip 600 (e.g., a component within the terminal device 120 of FIG. 1 and/or the network device 110 of FIG. 1) in accordance with one or more implementations of the present technology. The system chip 600 in FIG. 6 includes an input interface 601, an output interface 602, a processor 603, and a memory 604 (e.g., a non-transitory, computer-readable medium) that may be connected through an internal communication connection line, where the processor 603 is configured to execute code in the memory 604. The memory 604 can include code that corresponds to the method 400 of FIG. 4 and/or other aspects of the implementations described above. Accordingly, the processor 603 can implement the method 400 and/or other aspects of the implementations described above.

FIG. 7 is a schematic block diagram of a communications device 700 (e.g., an instance of the terminal device 120 of FIG. 1 and/or the network device 110 of FIG. 1) in accordance with one or more implementations of the present technology. The communications device 700 may include a processor 710 and a memory 720. The memory 720 may store program code, and the processor 710 may execute the program code stored in the memory 720. The memory 720 can include code that corresponds to the method 400 of FIG. 4 and/or other aspects of the implementations described above. Accordingly, the processor 710 can implement the method 400 and/or other aspects of the implementations described above.

It should be understood that the processor in the implementations of this technology may be an integrated circuit chip and has a signal processing capability. During implementation, the steps in the foregoing method may be implemented by using an integrated logic circuit of hardware in the processor or an instruction in the form of software. The processor may be a general-purpose processor, a digital signal processor (DSP), an application specific integrated circuit (ASIC), a field programmable gate array (FPGA) or another programmable logic device, a discrete gate or transistor logic device, and a discrete hardware component. The methods, steps, and logic block diagrams disclosed in the implementations of this technology may be implemented or performed. The general-purpose processor may be a microprocessor, or the processor may be alternatively any conventional processor or the like. The steps in the methods disclosed with reference to the implementations of this technology may be directly performed or completed by a decoding processor implemented as hardware or performed or completed by using a combination of hardware and software modules in a decoding processor. The software module may be located at a random-access memory, a flash memory, a read-only memory, a programmable read-only memory or an electrically erasable programmable memory, a register, or another mature storage medium in this field. The storage medium is located at a memory, and the processor reads information in the memory and completes the steps in the foregoing methods in combination with the hardware thereof.

It may be understood that the memory in the implementations of this technology may be a volatile memory or a non-volatile memory, or may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random-access memory (RAM) and is used as an external cache. For exemplary rather than limitative description, many forms of RAMs can be used, and are, for example, a static random-access memory (SRAM), a dynamic random-access memory (DRAM), a synchronous dynamic random-access memory (SDRAM), a double data rate synchronous dynamic random-access memory (DDR SDRAM), an enhanced synchronous dynamic random-access memory (ESDRAM), a synchronous link dynamic random-access memory (SLDRAM), and a direct Rambus random-access memory (DR RAM). It should be noted that the memories in the systems and methods described herein are intended to include, but are not limited to, these memories and memories of any other suitable type.

Examples

1. A method for operating a communications device, the method comprising:
  communicating a processing indicator (e.g., a SSB mapping indicator, a location information request, a measurement configuration, a measurement gap configuration, a timing parameter, a measurement gap list, or the like) between a communications network and a terminal device, wherein the processing indicator describes one or more details of a dynamically configured measurement gap that is aperiodic; and
  obtaining location measurements according to the dynamically configured measurement gap, wherein the location measurements correspond to a current geographic location of the terminal device.
2. The method of example 1 or a combination of portions thereof, wherein:
  the location measurements correspond to measurements of locating signals or locating portions of signals, such as positioning reference signal (PRS) resources, made at the terminal device during the dynamically configured measurement gap.
3. The method of any one or a combination of examples 1 or 2, further comprising:
  receiving a capability report from the terminal device at the communications network, wherein the capability report indicates details regarding a capacity of the terminal device to measure the PRS resource without a periodic measurement gap;
  determining a dynamic PRS processing configuration based on the capability report;
  wherein
  communicating the processing indicator includes sending the processing indicator from the communications network to the terminal device, wherein the processing indicator represents the dynamic PRS processing configuration; and
  obtaining the location measurements includes receiving a measurement report from the terminal device for locating the terminal device, wherein the measurement report represents the location measurements made by the terminal device.
4. The method of any one or a combination of examples 1-3, wherein:
  communicating the processing indicator includes receiving the processing indicator at the terminal device; and
  obtaining the location measurements includes
    generating the location measurements at the terminal device based on measuring the PRS resource according to one or more configuration parameters specified in the processing indicator; and
    sending a measurement report to the communications network, wherein the measurement report represents the location measurements that correspond to the current geographic location of the terminal device.
5. The method of any one or a combination of examples 1-4, further comprising:
  sending a capability report from the terminal device to the communications network, wherein the capability report indicates details regarding a capacity of the terminal device to measure the PRS resource without a periodic measurement gap;
  wherein
  the processing indicator corresponds to the capability report.
6. The method of any one or a combination of examples 1-5, further comprising:
  sending a measurement gap request from the terminal device to the communications network;
  wherein:
  the location measurements are generated based on measuring the PRS resource that corresponds to the measurement gap request.
7. The method of any one or a combination of examples 1-6, wherein sending the measurement gap request includes sending the measurement gap request as a communication targeting a lower layer than a layer associated with the communication of the processing indicator.
8. The method of any one or a combination of examples 1-7, wherein:
  the measurement gap request is sent via a medium access control (MAC) control element (CE); and the processing indicator is received via a radio resource control (RRC) communication.

9. The method of any one or a combination of examples 1-8, further comprising:

determining a measurement gap list representative of a predetermined set of PRS measurement configurations; and wherein sending the measurement gap request includes sending the measurement gap request including a selection for one configuration from the predetermined set.

10. The method of any one or a combination of examples 1-9, further comprising:

determining a measurement trigger according to the processing indicator;

wherein:

the processing indicator includes a gap configuration list, a timing parameter, or a combination thereof that describes the dynamically configured measurement gap; and the location measurements are generated based on measuring the PRS resource according to the measurement trigger.

11. The method of any one or a combination of examples 1-10, further comprising:

receiving an activation command for initiating the dynamically configured measurement gap as described in the processing indicator;

receiving a deactivation command for terminating measurement for the dynamically configured measurement gap; and wherein:

the location measurements are generated based on measuring the PRS resource according to the activation and deactivation commands 12. A wireless communications device comprising:

an antenna configured to wirelessly communicate one or more information or signals as described above;

a processing circuit coupled to the antenna and configured to perform a method of any one of examples 1-11, any complementary processes of examples 1-11, any portions of examples 1-11, or a combination thereof.

13. The wireless communications device of example 12, wherein the device is a user equipment configured to dynamically measure locating signals according to an aperiodic measurement gap and report the measurement back to a network.

14. The wireless communications device of example 12, wherein the device is a network device configured to coordinate a dynamic measurement of locating signals at a user equipment without a periodic measurement gap.

15. A tangible, non-transitory computer-readable medium having processing configurations thereon that, when executed by a processing circuit, cause the processing circuit to perform a method of any one or a combination of examples 1-14.

CONCLUSION

The above Detailed Description of examples of the disclosed technology is not intended to be exhaustive or to limit the disclosed technology to the precise form disclosed above. While specific examples for the disclosed technology are described above for illustrative purposes, various equivalent modifications are possible within the scope of the described technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or sub-combinations. Each of these processes or blocks may be implemented in a variety of different ways. Also, while processes or blocks are at times shown as being performed in series, these processes or blocks may instead be performed or implemented in parallel, or may be performed at different times. Further, any specific numbers noted herein are only examples; alternative implementations may employ differing values or ranges.

These and other changes can be made to the disclosed technology in light of the above Detailed Description. While the Detailed Description describes certain examples of the disclosed technology, as well as the best mode contemplated, the disclosed technology can be practiced in many ways, no matter how detailed the above description appears in text. Details of the system may vary considerably in its specific implementation, while still being encompassed by the technology disclosed herein. As noted above, particular terminology used when describing certain features or aspects of the disclosed technology should not be taken to imply that the terminology is being redefined herein to be restricted to any specific characteristics, features, or aspects of the disclosed technology with which that terminology is associated. Accordingly, the disclosure is not limited, except as by the appended claims. In general, the terms used in the following claims should not be construed to limit the disclosed technology to the specific examples disclosed in the specification, unless the above Detailed Description section explicitly defines such terms.

A person of ordinary skill in the art may be aware that, in combination with the examples described in the implementations disclosed in this specification, units and algorithm steps may be implemented by electronic hardware, or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

Although certain aspects of the disclosure are presented below in certain claim forms, the applicant contemplates the various aspects of the disclosure in any number of claim forms. Accordingly, the applicant reserves the right to pursue additional claims after filing this application to pursue such additional claim forms, in either this application or in a continuing application.

The invention claimed is:

1. A wireless communication method, the method comprising:

receiving, by a terminal device, from a network device, a processing indicator that describes one or more details of a dynamically configured measurement gap that is aperiodic, wherein the dynamically configured measurement gap is used for location measurements corresponding to a current geographic location of the terminal device, and the dynamically measurement configuration comprises a measurement gap configuration, and wherein the processing indicator further comprises a media access control control element (MAC CE) activation command, and the MAC CE activation command is for activating the dynamically configured measurement gap described by the processing indicator;

in response to receiving the MAC CE activation command, transmitting, by the terminal device, an activation response by sending, to the network device, a physical uplink control channel (PUCCH) with Hybrid Automatic Repeat request (HARQ) acknowledgment information in slot n that corresponds to a physical downlink shared channel (PDSCH) carrying the MAC CE activation command;

determining, by the terminal device, a measurement trigger for initiating location-based measurements based on the measurement gap configuration, performing, by the terminal device in response to the measurement trigger, measurement of positioning reference signal (PRS) according to the dynamically configured measurement gap to derive a resource measurement, generating, by the terminal device, a measurement report based on the resource measurement, and sending, by the terminal device, the measurement report to the network device, wherein the measurement report is for calculating the current geographic location of the terminal device;

receiving, by the terminal device, a MAC CE deactivation command from the network device, wherein the MAC CE deactivation command is for deactivating an activated measurement gap; and sending, by the terminal device to the network device, as a deactivation response, a PUCCH with HARQ acknowledgment information in slot n that corresponds to a PDSCH carrying the MAC CE deactivation command.

2. The method of claim 1, further comprising: before receiving the MAC CE deactivation command, sending, by the terminal device, a measurement gap request to the network device to request a measurement gap configuration for the location measurements.

3. The method of claim 1, wherein the deactivated measurement gap starts from a first slot following slot $$n + 3N_{slot}^{subframe,\mu},$$

where µ represents a subcarrier spacing (SCS) configuration for a PUCCH.

4. The method of claim 1, wherein the activated measurement gap starts from the first slot following the slot $$n + 3N_{slot}^{subframe,\mu},$$

where µ represents a SCS configuration for a PUCCH.

5. The method of claim 2, further comprising: before receiving the MAC CE activation command, receiving, by the terminal device, a measurement gap list representative of a predetermined set of PRS measurement configurations; and wherein sending, by the terminal device, the measurement gap request includes:

sending, by the terminal device, the measurement gap request including a selection for one configuration from the predetermined set.

6. A terminal device, comprising:

a transceiver, configured to receive, from a network device, a processing indicator that describes one or more details of a dynamically configured measurement gap that is aperiodic, wherein the dynamically configured measurement gap is used for location measurements corresponding to a current geographic location of the terminal device, and the dynamically measurement configuration comprises a measurement gap configuration, and the processing indicator further comprises a media access control control element (MAC CE) activation command, and the MAC CE activation command is for activating the dynamically configured measurement gap described by the processing indicator; and in response to receiving the MAC CE activation command, transmit an activation response by sending, to the network device, a physical uplink control channel (PUCCH) with Hybrid Automatic Repeat request (HARQ) acknowledgment information in slot n that corresponds to a physical downlink shared channel (PDSCH) carrying the MAC CE activation command; and a processor, configured to:

determine a measurement trigger for initiating location-based measurements based on the measurement gap configuration;

perform, in response to the measurement trigger, measurement of positioning reference signal (PRS) according to the dynamically configured measurement gap to derive a resource measurement, and generate a measurement report based on the resource measurement, wherein the transceiver is further configured to:

send the measurement report to the network device, wherein the measurement report is for calculating the current geographic location of the terminal device;

receive a MAC CE deactivation command from the network device, wherein the MAC CE deactivation command is for deactivating an activated measurement gap; and send, to the network device, as a deactivation response, a PUCCH with HARQ acknowledgment information in slot n that corresponds to a PDSCH carrying the MAC CE deactivation command.

7. The terminal device of claim 6, wherein the transceiver is further configured to: before receiving the MAC CE deactivation command, send a measurement gap request to the network device to request a measurement gap configuration for the location measurements.

8. The terminal device of claim 6, wherein the deactivated measurement gap starts from a first slot following slot $$n + 3N_{slot}^{subframe,\mu},$$

where µ represents a subcarrier spacing (SCS) configuration for a PUCCH.

9. The terminal device of claim 6, wherein the activated measurement gap starts from the first slot following the slot $$n + 3N_{slot}^{subframe,\mu},$$

where µ represents a SCS configuration for a PUCCH.

10. The terminal device of claim 7, wherein the transceiver is further configured to:

send the measurement gap request including a selection for one configuration from a predetermined set of PRS measurement configurations to the network device; and receive a measurement gap list representative of the predetermined set from the network device.

11. A network device, comprising:

a transceiver, configured to:

send to a terminal device a processing indicator as a dynamically measurement configuration that describes one or more details of a dynamically configured measurement gap that is aperiodic, wherein the dynamically configured measurement gap is used for location measurements corresponding to a current geographic location of the terminal device, and the dynamically measurement configuration comprises a measurement gap configuration, the processing indicator further comprises a media access control control element (MAC CE) activation command;

send the MAC CE activation command to the terminal device, wherein the MAC CE activation command is for activating the dynamically configured measurement gap described by the processing indicator;

receive, from the terminal device and in response to the MAC CE activation command, a physical uplink control channel (PUCCH) with Hybrid Automatic Repeat request (HARQ) acknowledgment information in slot n that corresponds to a physical downlink shared channel (PDSCH) carrying the MAC CE activation command;

receive a measurement report from the terminal device, wherein the measurement report is obtained based on the dynamically configured measurement gap and is for calculating the current geographic location of the terminal device;

send, in response to the received measurement report, a MAC CE deactivation command to the terminal device, wherein the MAC CE deactivation command is for deactivating an activated measurement gap; and receive, from the terminal device, as a deactivation response, a PUCCH with HARQ acknowledgment information in slot n that corresponds to a PDSCH carrying the MAC CE deactivation command.

12. The network device of claim 11, further comprising:

before sending the MAC CE deactivation command, receiving, by the network device, a measurement gap request from the terminal device to request a measurement gap configuration for the location measurements.

13. The network device of claim 11, wherein the deactivated measurement gap starts from a first slot following slot $$n + 3N_{slot}^{subframe,\mu},$$

where $\mu$ represents a subcarrier spacing, SCS, configuration for a PUCCH.

14. The network device of claim 11, wherein the activated measurement gap starts from the first slot following the slot $$n + 3N_{slot}^{subframe,\mu},$$

where $\mu$ represents an SCS configuration for a PUCCH.

15. The network device of claim 12, wherein the transceiver is further configured to:

receive the measurement gap request including a selection for one configuration from a predetermined set of PRS measurement configurations from the terminal device; and send a measurement gap list representative of the predetermined set to the terminal device.

* * * * *